United States Patent
Zhang et al.

(10) Patent No.: US 12,107,797 B2
(45) Date of Patent: Oct. 1, 2024

(54) ROBUST UPLINK AND DOWNLINK BEAM INDICATION

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Wei Zeng, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,537

(22) PCT Filed: Feb. 12, 2020

(86) PCT No.: PCT/CN2020/074956
§ 371 (c)(1),
(2) Date: Sep. 23, 2021

(87) PCT Pub. No.: WO2021/159355
PCT Pub. Date: Aug. 19, 2021

(65) Prior Publication Data
US 2022/0376880 A1  Nov. 24, 2022

(51) Int. Cl.
H04W 72/044 (2023.01)
H04L 5/00 (2006.01)
H04W 72/20 (2023.01)

(52) U.S. Cl.
CPC .......... *H04L 5/0094* (2013.01); *H04L 5/0053* (2013.01); *H04W 72/046* (2013.01); *H04W 72/20* (2023.01)

(58) Field of Classification Search
CPC .... H04W 72/046; H04W 72/20; H04B 7/088; H04B 7/063; H04B 7/0695;
(Continued)

(56) References Cited

U.S. PATENT DOCUMENTS 11,115,962 B2    9/2021  Kang et al.
2019/0222289 A1* 7/2019  John Wilson ....... H04W 72/046
(Continued)

FOREIGN PATENT DOCUMENTS

CN    109076364 A    12/2018
CN    109076378 A    12/2018
(Continued)

OTHER PUBLICATIONS

International Search Report and Written Opinion of the International Searching Authority directed to related International Patent Application No. PCT/CN2020/074956, mailed Nov. 17, 2020; 7 pages.
(Continued)

*Primary Examiner* — Chi Ho A Lee
(74) *Attorney, Agent, or Firm* — Sterne, Kessler, Goldstein & Fox P.L.L.C.

(57) ABSTRACT

An exemplary unified framework that is disclose for identifying which communication beams are to be uplink and/or downlink communication beams. This exemplary unified framework can utilize one or more universal Transmission Configuration Indication (TCI) states to identify the one or more communication beams that are to be utilized for uplink and/or downlink communication. The one or more universal TCI states can be used identify the one or more communication beams. And the one or more universal TCI states can include applicability information to identify which control channels, such as the PDCCH and the PUCCH to provide some examples, data channels, such as the PDSCH and/or the PUSCH to provide some examples, and/or signals, such as the DMRS, the PTRS, the SRS, and/or the CSI-RS to provide some examples, are to utilize the communication beams identified by the one or more universal TCI states.

20 Claims, 5 Drawing Sheets

(58) Field of Classification Search
CPC . H04B 7/06968; H04L 5/0048; H04L 5/0094; H04L 5/0044; H04L 5/0053; H04L 5/0023
See application file for complete search history.

(56) References Cited

U.S. PATENT DOCUMENTS

| | | | |
|---|---|---|---|
| 2019/0260524 A1 | 8/2019 | Nam et al. | |
| 2019/0373450 A1 | 12/2019 | Zhou et al. | |
| 2019/0387547 A1 | 12/2019 | Shin et al. | |
| 2020/0015200 A1* | 1/2020 | Vilaipornsawai | H04W 72/23 |
| 2020/0112411 A1* | 4/2020 | Khoshnevisan | H04L 25/0204 |
| 2020/0153666 A1* | 5/2020 | Khoshnevisan | H04L 5/0035 |
| 2020/0178180 A1* | 6/2020 | Zhang | H04W 52/42 |
| 2020/0205187 A1* | 6/2020 | Khoshnevisan | H04L 5/0035 |
| 2020/0374717 A1* | 11/2020 | He | H04L 5/0048 |
| 2021/0022182 A1* | 1/2021 | Mondal | H04W 88/06 |
| 2021/0143954 A1* | 5/2021 | Duan | H04W 52/0216 |
| 2021/0168742 A1 | 6/2021 | Li | |
| 2021/0243794 A1 | 8/2021 | Li | |
| 2021/0337548 A1* | 10/2021 | Gao | H04W 72/0446 |
| 2022/0360408 A1* | 11/2022 | Jung | H04B 7/0628 |

FOREIGN PATENT DOCUMENTS

| | | |
|---|---|---|
| CN | 109076593 A | 12/2018 |
| CN | 109315009 A | 2/2019 |
| CN | 109792745 A | 5/2019 |
| CN | 109845371 A | 6/2019 |
| CN | 110326243 A | 10/2019 |
| EP | 3826417 A1 | 5/2021 |
| EP | 3855824 A1 | 7/2021 |
| WO | WO 2019195814 A1 | 10/2019 |

OTHER PUBLICATIONS

Ericsson, "On Beam Indication, Measurement, and Reporting," 3GPP TSG-RAN WGI NR Ad Hoc #3 R1-1716350, Sep. 21, 2017; Retrieved Sep. 15, 2021; 13 pages.

Nokia et al., "Remaining Details on Beam Indication, Measurement and Reporting," 3GPP TSG RAN WG1 Meeting AH1-18 R1-1800751, Jan. 26, 2018; Retrieved Sep. 15, 2021; 6 pages.

Extended European Search Report directed to related European Application No. 20918479.5, mailed on Jun. 30, 2023; 7 pages.

3GPP, TR 21.915 v15.0.0, "3$^{rd}$ Generation Partnership Project; Technical Report; LTE; 5G; Digital Cellular Telecommunications System (Phase 2+) (GSM); Universal Mobile Telecommunications System (UMTS) (Release 15)," ETSI, Sophia Antipolis, Valbonne, France; Oct. 2019; 120 pages.

3GPP, TR 21.916 v16.0.1, "3$^{rd}$ Generation Partnership Project; Technical Report; LTE; 5G; Digital Cellular Telecommunications System (Phase 2+) (GSM); Universal Mobile Telecommunications System (UMTS) (Release 16)," ETSI, Sophia Antipolis, Valbonne, France; Sep. 2021; 161 pages.

Office Action and Search Report directed to related Chinese Application No. 202080086797.5, with English-language translation of the Search Report attached, mailed Jun. 13, 2024; 12 pages.

Notice of Preliminary Rejection directed to related Korean Application No. 10-2022-7019910, with English-language translation attached, mailed Aug. 13, 2024; 8 pages.

AT&T, NTT DOCOMO, Inc., "RAN1 UE features list for Rel-16 NR," 3GPP TSG RAN WG1 98bis, Chongqing, China, Oct 14-18, 2019, R1-1911751; 57 pages.

* cited by examiner

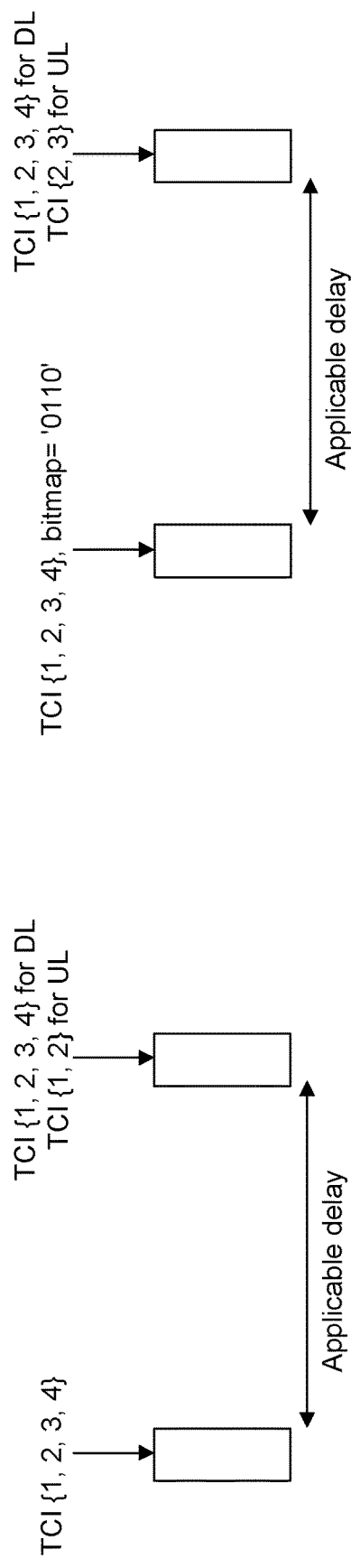
FIG. 5A
FIG. 5B
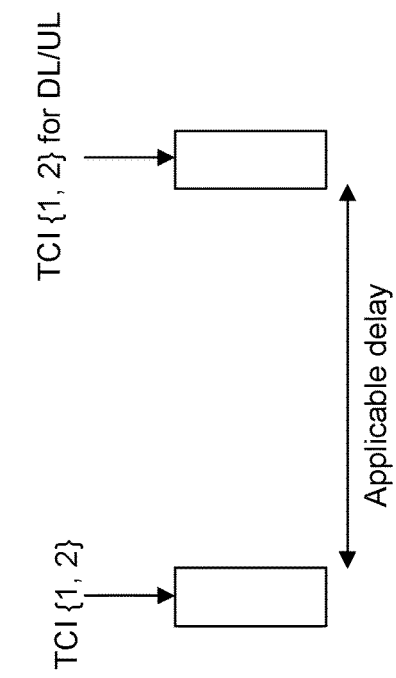
FIG. 5D
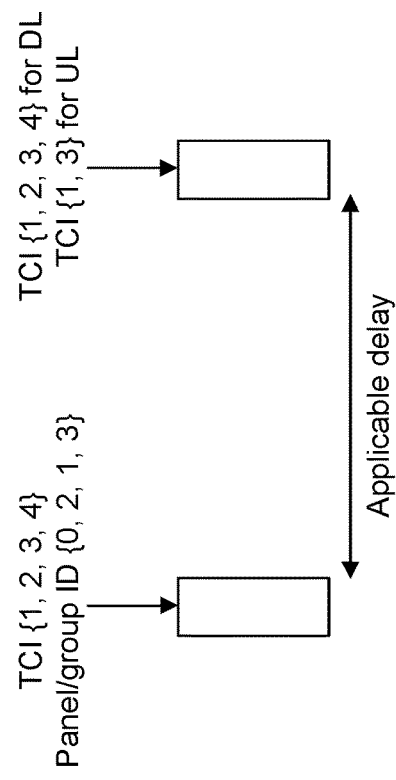
FIG. 5C

ROBUST UPLINK AND DOWNLINK BEAM INDICATION

CROSS REFERENCE TO RELATED APPLICATIONS

The present application is a United States National Phase of International Application No. PCT/CN2020/074956, filed on Feb. 12, 2020, which is incorporated herein by reference in its entirety.

BACKGROUND

Field of Disclosure

The described embodiments generally relate to beam determination in multiple-input and multiple-output (MIMO) networks, including 5G MIMO wireless networks.

Related Art 5G is the fifth generation wireless technology standardized the usage of multiple-input and multiple-output (MIMO) networks, in particular massive MIMO networks, for wireless networks. MIMO and massive MIMO use multiple communication beams to exploit multipath propagation to multiply the capacity of these beams. MIMO networks typically include two or four antennas while massive MIMO networks typically include a larger number of antennas, for example, tens or even hundreds of antennas. In these MIMO and massive MIMO networks, Next Generation NodeBs (gNBs) and User Equipment (UEs) often maintain multiple communication beams.

SUMMARY

Some embodiments of this disclosure can include a method for implementing a beam determination procedure. The method includes receiving a universal Transmission Configuration Indication (TCI) state, the universal TCI state including applicability information; identifying a communication beam from the universal TCI state that is to be an uplink communication beam or a downlink communication beam; identifying one or more control channels, one or more data channels, or one or more signals from the applicability information that are to utilize the communication beam; and configuring the communication beam to utilize the one or more control channels, the one or more data channels, or the one or more signals.

In these embodiments, the one or more control channels can include a Physical Downlink Control Channel (PDCCH) or a Physical Uplink Control Channel (PUCCH). In these embodiments, the one or more data channels can include a Physical Downlink Shared Channel (PDSCH) or a Physical Uplink Shared Channel (PUSCH). In these embodiments, the one or more signals can include a demodulation reference signal (DMRS), a phase-tracking reference signal (PTRS), a sounding reference signal (SRS), or a channel-state information reference signal (CSI-RS).

In these embodiments, the receiving can include receiving one or more Downlink Control Information (DCI) messages, one or more Medium Access Channel (MAC) Control Elements (CEs), and/or or one or more RRC messages having the universal TCI state. In these embodiments, the one or more DCI messages, the one or more MAC CEs, and/or the one or more RRC messages can include one or more fields to identify the communication beam or the one or more control channels, the one or more data channels, or the one or more signals.

In these embodiments, the universal TCI state can be configured to indicate one or more quasi co-location (QCL) relationships between two or more downlink reference signals. In these embodiments, the method can further include deriving one or more uplink power control parameters using one or more of the two or more downlink reference signals.

In these embodiments, the receiving can include receiving universal TCI states for downlink communication beams. In these embodiments, the method can further include selecting the universal TCI state from among the TCI states for downlink communication beams. In these embodiments, the selecting can include selecting the universal TCI state from among the TCI states for downlink communication beams in accordance with a TCI state selection bit map.

Some embodiments of this disclosure can include a User Equipment (UE) for implementing a beam determination procedure. The UE can include physical layer (PHY) circuitry and processor circuitry. The PHY can receive a universal Transmission Configuration Indication (TCI) state from an Access Node (AN), the universal TCI state including applicability information. The processor circuitry can identify a communication beam from the universal TCI state that is to be an uplink communication beam or a downlink communication beam, identify one or more control channels, one or more data channels, and/or one or more signals from the applicability information that are to utilize the communication beam, and configure the communication beam to transmit on and/or to receive from the one or more control channels, the one or more data channels, and/or the one or more signals.

In these embodiments, the one or more control channels can include a Physical Downlink Control Channel (PDCCH) or a Physical Uplink Control Channel (PUCCH). In these embodiments, the one or more data channels can include a Physical Downlink Shared Channel (PDSCH) or a Physical Uplink Shared Channel (PUSCH). In these embodiments, the one or more signals can include a demodulation reference signal (DMRS), a phase-tracking reference signal (PTRS), a sounding reference signal (SRS), or a channel-state information reference signal (CSI-RS).

In these embodiments, the PHY circuitry can receive one or more Downlink Control Information (DCI) messages, one or more Medium Access Channel (MAC) Control Elements (CEs), and/or or one or more RRC messages having the universal TCI state. In these embodiments, the one or more DCI messages, the one or more MAC CEs, and/or the one or more RRC messages can include a field to identify the communication beam or the one or more control channels, the one or more data channels, and/or the one or more signals.

In these embodiments, the universal TCI state can indicate one or more quasi co-location (QCL) relationships between two or more downlink reference signals. In these embodiments, the PHY circuitry can derive one or more uplink power control parameters using one or more of the two or more downlink reference signals.

In these embodiments, the PHY circuitry can receive universal TCI states for downlink communication beams. In these embodiments, the processor circuitry can select the universal TCI state from among the TCI states for downlink communication beams. In these embodiments, the processor circuitry can select the universal TCI state from among the TCI states for downlink communication beams in accordance with a TCI state selection bit map.

Some embodiments of this disclosure can include a wireless network for implementing a beam determination procedure. The wireless network can include an Access Node (AN) and a User Equipment (UE). The AN can provide a universal Transmission Configuration Indication (TCI) state from an Access Node (AN), the universal TCI state including applicability information. The UE can identify a communication beam from the universal TCI state that is to be an uplink communication beam or a downlink communication beam; identify one or more control channels, one or more data channels, and/or one or more signals from the applicability information that are to utilize the communication beam; and configure the communication beam to transmit on and/or to receive from the one or more control channels, the one or more data channels, and/or the one or more signals.

In these embodiments, the one or more control channels can include a Physical Downlink Control Channel (PDCCH) or a Physical Uplink Control Channel (PUCCH). In these embodiments, the one or more data channels can include a Physical Downlink Shared Channel (PDSCH) or a Physical Uplink Shared Channel (PUSCH). In these embodiments, the one or more signals can include a demodulation reference signal (DMRS), a phase-tracking reference signal (PTRS), a sounding reference signal (SRS), or a channel-state information reference signal (CSI-RS).

In these embodiments, the UE can receive one or more Medium Access Channel (MAC) Control Elements (CEs), and/or or one or more RRC messages having the universal TCI state. In these embodiments, the one or more DCI messages, the one or more MAC CEs, and/or the one or more RRC messages can include a field to identify the communication beam or the one or more control channels, the one or more data channels, and/or the one or more signals.

In these embodiments, the universal TCI state can indicate one or more quasi co-location (QCL) relationships between two or more downlink reference signals. In these embodiments, the UE can derive one or more uplink power control parameters using one or more of the two or more downlink reference signals.

In these embodiments, the UE can receive universal TCI states for downlink communication beams. In these embodiments, the UE can select the universal TCI state from among the universal TCI states for downlink communication beams.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

FIG. 5A through FIG. 5D graphically illustrate exemplary selecting and applying operations for the exemplary beam determination procedures according to some embodiments of the disclosure;

Figure 1:
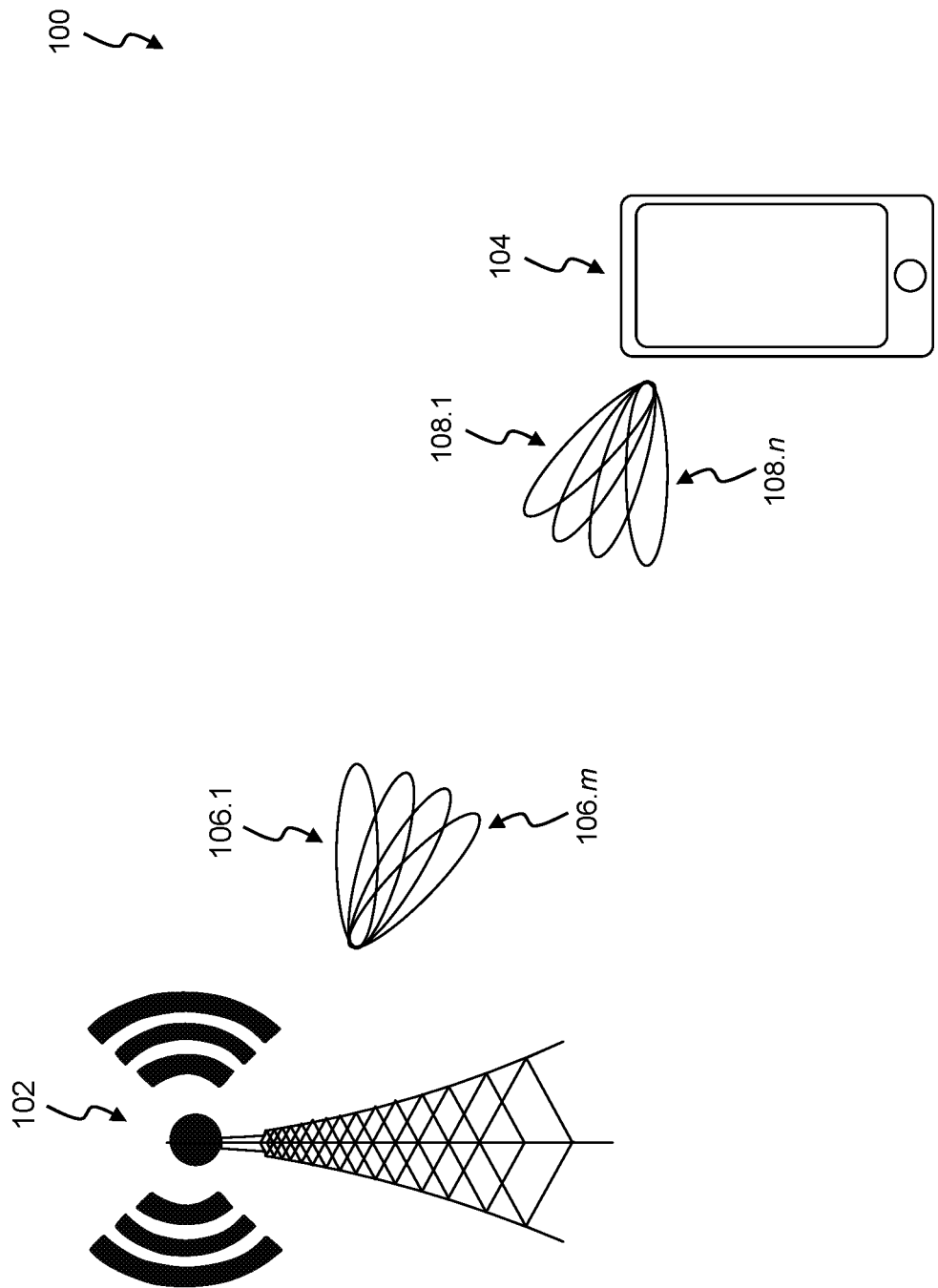
FIG. 1 graphically illustrates an exemplary wireless network according to some embodiments of the disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Beam determination, also referred to as beam indication, refers to a set of procedures for Access Nodes (ANs) and User Equipment (UEs) to select from among these multiple communication beams for downlink and/or uplink communications. In both 3GPP Release 15 (Rel-15) and 3GPP Release 16 (Rel-16), Transmission Configuration Indication (TCI) states indicate which of these multiple communication beams are to be used are to be used for downlink communications. These TCI states are sent in Downlink Control Information (DCI) messages on downlink control channels, for example, a Physical Downlink Control Channel (PDCCH) and/or a Physical Downlink Shared Channel (PDSCH), to the UEs. The UEs can identify one or more communication beams to be used to by the ANs to transmit one or more downlink reference signals over these downlink control channels from these TCI states. The UEs can utilize these communication beams to receive downlink communications from the ANs. On the other hand, spatial relation information is utilized to indicate which one these multiple communication beams are to be used for uplink communications in both Rel-15 and Rel-16. For example, the TCI states can identify that one or more of the multiple communication beams are quasi co-located with the one or more communication beams used by the ANs to transmit one or more downlink reference signals. In this example, the UEs can thereafter utilize these quasi co-located communication beams for uplink communications with the ANs.

Exemplary Wireless Network

FIG. 1 graphically illustrates an exemplary wireless network according to some embodiments of the disclosure. A wireless network 100 as illustrated in FIG. 1 is provided for the purpose of illustration only and does not limit the disclosed embodiments. In the exemplary embodiment illustrated in FIG. 1, the wireless network 100 can include, but are not limited to, an access node (AN) 102 and a user equipment (UE) 104. The UE 104 can include, but are not limited to, a Wireless Local Area Network (WLAN) station such as a wireless communication device, a smart phone, a laptop computing device, a desktop computing device, a tablet computing device, a personal assistants, a monitor, a television, a wearable device, and the like. As used herein, the terms "access node," "access point," or the like can describe equipment that provides the radio baseband functions for data and/or voice connectivity between a network and one or more users. These access nodes can be referred to as Base Stations (BSs), Next Generation NodeBs (gNBs), Radio Access Network (RAN) nodes, evolved NodeBs (eNBs), NodeBs, Road Side Units (RSUs), Transmission Reception Point (TRxPs or TRPs), and so forth, and can include ground stations, such as terrestrial access points, or satellite stations providing coverage within a geographic area, also referred to a serving cell. The AN 102 can include but is not limited to a WLAN electronic device such as a wireless router, a wearable device (for example, a smart watch), a wireless communication device (for example, a smart phone), or a combination thereof. As used herein, the term "downlink" refers to the direction from the AN 102 to the UE 104. The term "uplink" refers to the direction from the UE 104 to the AN 102.

Figure 2:
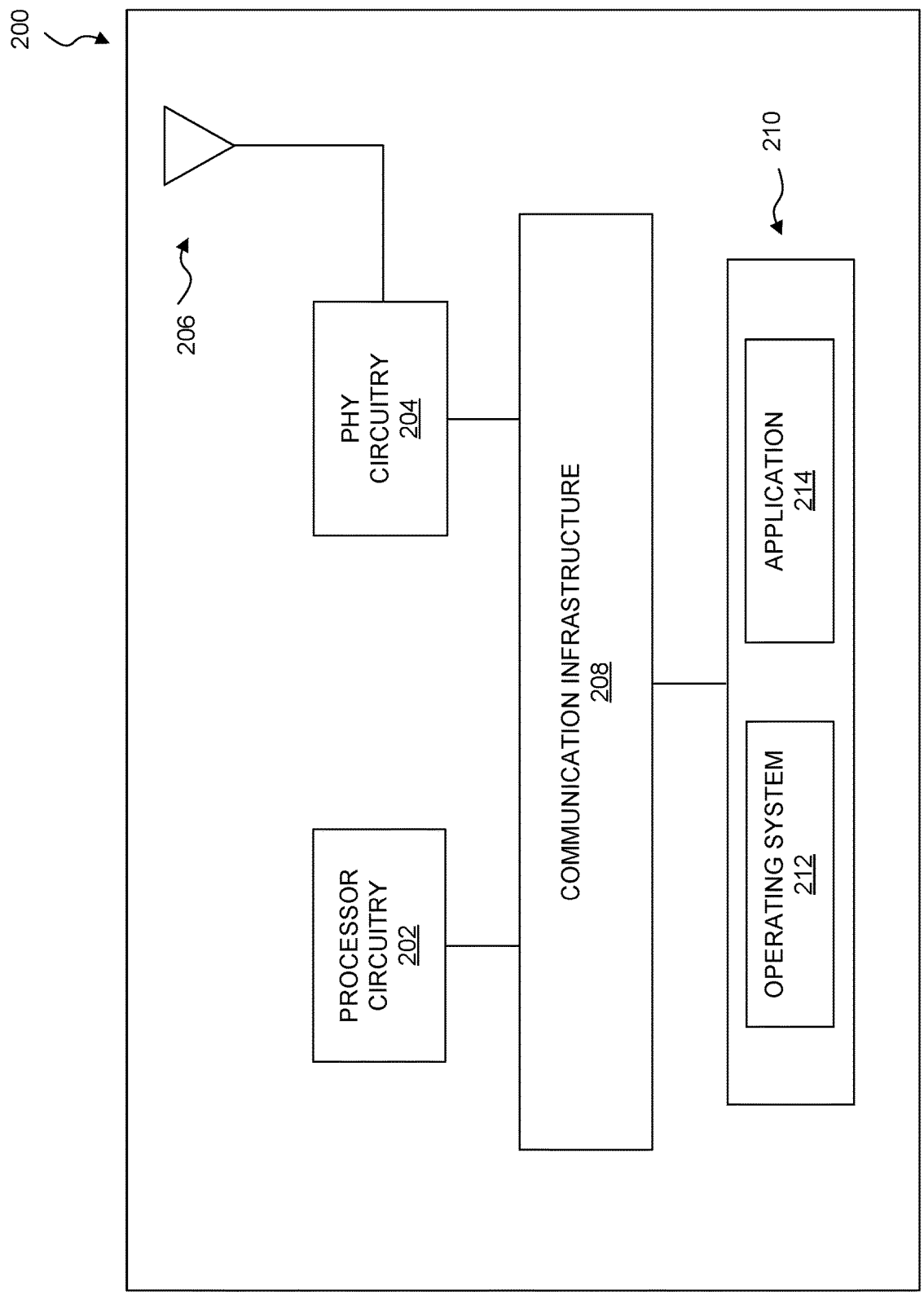
FIG. 2 illustrates a block diagram of exemplary wireless systems of electronic devices according to some embodiments of the disclosure.

Exemplary Embodiments for Access Nodes and/or User Equipment (UE) within the Exemplary Wireless Network FIG. 2 illustrates a block diagram of exemplary wireless systems of electronic devices according to some embodiments of the disclosure. In the exemplary embodiment illustrated in FIG. 2, a wireless system 200 of the electronic device can include processor circuitry 202, physical layer (PHY) circuitry 204, an antenna array 206, a communication infrastructure 208, and a memory subsystem 210. The wireless system 200 as illustrated in FIG. 2 can be implemented as a standalone, or a discrete device, and/or can be incorporated within or coupled to another electrical device, or host device, such as a wireless communication device, a smart phone, a laptop computing device, a desktop computing device, a tablet computing device, a personal assistants, a monitor, a television, a wearable device, and/or any other suitable electronic device that will be apparent to those skilled in the relevant art(s) without departing from the spirit and scope of the disclosure. The wireless system 200 as illustrated in FIG. 2 can represent an exemplary embodiment of the AN 102 and/or the UE 104 as described above in FIG. 1 and/or can be incorporated within or coupled to the AN 102 and/or the UE 104 as described above in FIG. 1.

In the exemplary embodiment illustrated in FIG. 2, the processor circuitry 202 can include, or can be, any of a microprocessor, graphics processing unit, or digital signal processor, and their electronic processing equivalents, such as an Application Specific Integrated Circuit (ASIC) or Field Programmable Gate Array (FPGA). The processor circuitry 202 signifies one or more tangible data and information processing devices that physically transform data and information, typically using a sequence transformations, also referred to as an operational control flow. Data and information can be physically represented by an electrical, magnetic, optical or acoustical signal that is capable of being stored, accessed, transferred, combined, compared, or otherwise manipulated by the processor circuitry 202. The processor circuitry 202 can signify a singular processor and multi-core systems or multi-processor arrays, including graphic processing units, digital signal processors, digital processors or combinations of these elements. In some embodiments, the processor circuitry 202 can execute one or more elements of a protocol stack, for example one or more elements of a 5G protocol stack as to be described below in further detail.

The PHY circuitry 204 includes circuitry and/or control logic to carry out various radio/network protocol and radio control functions that enable communication with one or more radio networks. The radio control functions can include, but are not limited to, signal modulation/demodulation, encoding/decoding, and/or radio frequency shifting to provide some examples. In some embodiments, the PHY circuitry 204 can perform Fast-Fourier Transform (FFT), pre-coding, and/or constellation mapping/de-mapping functionality. In some embodiments, the PHY circuitry 204 can perform convolution, tail-biting convolution, turbo, Viterbi, and/or Low Density Parity Check (LDPC) encoding/decoding. In the exemplary embodiment illustrated in FIG. 2, the PHY circuitry 204 can process baseband signals received from the communication infrastructure 208 and to generate baseband signals for the communication infrastructure 208. In some embodiments, the PHY circuitry 204 can connect to and communicate on wireline and/or wireless networks. For example, the PHY circuitry 204 can include a wireless subsystem, for example, cellular subsystem, a WLAN subsystem, and/or a Bluetooth™ subsystem, having various wireless radio transceiver and wireless protocol(s) as will be understood by those skilled in the relevant art(s) without departing from the sprit and scope of the disclosure. The wireless subsystem can include circuitry and/or control logic for connecting to and communicating on wireless networks. The wireless networks can include cellular networks such as, but are not limited to, 3G/4G/5G wireless networks, Long-Term Evolution (LTE) wireless networks, and the like to provide some examples.

In some embodiments, the processor circuitry 202 and/or the PHY circuitry 204 can execute the 5G protocol stack having at least a 5G layer-1, a 5G layer-2, and a 5G layer-3. The 5G layer-1 can include a physical (PHY) layer. The PHY layer can transmit and/or receive physical layer signals over one or more physical channels that may be received from and/or transmitted to the one or more radio networks. The PHY layer can further perform link adaptation or adaptive modulation and coding (AMC), power control, cell search (for example, initial synchronization and handover purposes), and other measurements used by higher layers, such as the RRC layer. The PHY layer can further perform error detection on one or more transport channels, forward error correction (FEC) coding/decoding of the one or more transport channels, modulation/demodulation of the one or more physical channels, interleaving, rate matching, mapping onto the one or more physical channels, and Multiple Input Multiple Output (MIMO) antenna processing. In some embodiments, the PHY layer can process requests from and provide indications to the MAC layer over one or more transport channels.

The 5G layer-2 can include a Medium Access Control (MAC) layer, a Radio Link Control (RLC) layer, and a Packet Data Convergence Protocol (PDCP) layer. The MAC layer processes requests from, and provides indications to, the RLC layer over one or more logical channels. The MAC layer can perform mapping between the one or more logical channels and the one or more transport channels, multiplexing of MAC Service Data Units (SDUs) from one or more logical channels onto Transport Blocks (TBs) to be delivered to the PHY layer via the one or more transport channels, de-multiplexing the MAC SDUs to one or more logical channels from TBs delivered from the PHY layer via the one or more transport channels, multiplexing the MAC SDUs onto TBs, scheduling information reporting, error correction through HARQ, and logical channel prioritization. The RLC layer processes requests from and provides indications to the PDCP layer over one or more RLC channels. The RLC 930 may operate in a plurality of modes of operation, including: Transparent Mode (TM), Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer processes requests from and provides indications to the RRC layer over one or more radio bearers. The PDCP layer may execute header compression and decompression of Internet Protocol (IP) data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations such as ciphering, deciphering, integrity protection, and/or integrity verification to provide some examples.

The 5G layer-3 can include the Radio Resource Control (RRC) layer. The RRC layer configures aspects of the 5G layer-1, the 5G layer-2, and/or the 5G layer-3. The RRC layer can include broadcast of system information, broadcast of system information related to the access stratum (AS), paging, establishment, maintenance and release of RRC connection between UEs and access nodes, for example, RRC connection paging, RRC connection establishment, RRC connection modification, and RRC connection release, establishment, configuration, maintenance and release of point to point Radio Bearers, security functions including key management, inter-RAT mobility, and measurement configuration for UE measurement reporting.

The antenna array 206 can include one or more antenna elements, each of which is capable of converting electrical signals into radio waves to travel through the air through communication beams, such as the communication beams 106.1 through 106.m and/or the communication beams 108.1 through 108.n as described above in FIG. 1. The one or more antenna elements can be omnidirectional, direction, or a combination thereof.

The memory subsystem 210 includes a number of memories including a main random-access memory (RAM), or other volatile storage device, for storage of instructions and data during program execution and/or a read only memory (ROM) in which instructions are stored. The memory subsystem 210 can provides persistent storage for program and data files, and may include a hard disk drive, a floppy disk drive along with associated removable media, a CD-ROM drive, an optical drive, a flash memory, or removable media cartridges. In the exemplary embodiment illustrated in FIG. 2, the memory subsystem 210 can optionally include an operating system 212 and an application 214. The operating system 212 can be Microsoft's Windows, Sun Microsystems's Solaris, Apple Computer's MacOs, Linux or UNIX to provide some examples. The computer system also typically can include a Basic Input/Output System (BIOS) and processor firmware. The operating system, the BIOS, and/or the firmware can be used by the processor circuitry 202 to control the PHY circuitry 204, the antenna array 206, the communication infrastructure 208, and/or the memory subsystem 210. In some embodiments, the operating system 212 maintains one or more network protocol stacks, such as an Internet Protocol (IP) stack, and/or a cellular protocol stack to provide some examples, that can include a number of logical layers. At corresponding layers of the protocol stack, the operating system 212 includes control mechanism and data structures to perform the functions associated with that layer. The application 214 can include applications, for example, used by the wireless system 200 and/or a user of wireless system 200. The applications in application 254 can include applications such as, but not limited to, Siri™, FaceTime™, radio streaming, video streaming, remote control, and/or other user applications which will be recognized by those skilled in the relevant art(s) without departing from the spirit and scope of the disclosure.

Exemplary Beam Determination

As discussed above, beam determination, or beam indication, refers to a set of procedures for the AN 102, the UE 104, and/or the wireless system 200 to select from among communication beams 106.1 through 106.m and communication beams 108.1 through 108.n for downlink and/or uplink communications. The detailed description to follow is to describe various exemplary beam determination procedures that can overcome one or more deficiencies in the beam determination as defined by both Rel-15 and Rel-16.

For example, the beam determination procedures as described in both Rel-15 and Rel-16 are different for different channels, such as control and/or data channels, which can result in large signaling overhead. Some of the exemplary beam determination procedures to be described below can provide an exemplary unified framework for determining which communication beams from among the communication beams 106.1 through 106.m are to be uplink and/or downlink communication beams. The exemplary unified framework can apply one or more universal Transmission Configuration Indication (TCI) states to identify which communication beams, for example, one or more communication beams from among the communication beams 106.1 through 106.m, are to be applied to the control channels, such as the Physical Downlink Control Channel (PDCCH) and the Physical Uplink Control Channel (PUCCH) to provide some examples, data channels, such as the Physical Downlink Shared Channel (PDSCH) and/or the Physical Uplink Shared Channel (PUSCH) to provide some examples, and/or signals, such as demodulation reference signal (DMRS), the phase-tracking reference signal (PTRS), the sounding reference signal (SRS) and/or the channel-state information reference signal (CSI-RS) to provide some examples. Alternatively, or in addition to, the exemplary unified framework can re-purpose various Downlink Control Information (DCI) messaging fields and/or introduce new DCI formats to identify which communication beams are to be applied to the control channels, the data channels, and/or the signals.

As another example, the downlink and/or uplink communication capabilities of the UE 104 can be different. In some embodiments, the AN 102, the UE 104, and/or the wireless system 200 can support a different number of uplink communication beams compared to downlink communication beams. Some of the exemplary beam determination procedures to be described below can indicate M-TCI states for downlink communication beams to support M downlink communication beams and N-TCI states for uplink communication beams to support N uplink communication beams. As to be described in further detail below, the exemplary beam determination procedures can select the N-TCI states for uplink communication beams from among the M-TCI states for downlink communication beams and/or can apply the N-TCI states for both the uplink communication beams and the downlink communication beams.

As a further example, the beam indication schemes for uplink are based upon the TCI states in both Rel-15 and Rel-16 which can causes difficulty in deriving uplink power control parameters for uplink communication. Some of the exemplary beam determination procedures to be described below can derive the uplink power control parameters when the TCI states are indicated for the uplink communication beams.

Exemplary Unified Framework

The following detailed description is to describe an exemplary unified framework that is utilized by the exemplary beam determination procedures for identifying which communication beams, for example, one or more communication beams from among the communication beams 106.1 through 106.m, are to be uplink and/or downlink communication beams. This exemplary unified framework can utilize one or more universal Transmission Configuration Indication (TCI) states to identify the one or more communication beams that are to be utilized for uplink and/or downlink communication. The one or more universal TCI states can be used identify the one or more communication beams. For example, the one or more universal TCI states can include configuration parameters for configuring a quasi co-location (QCL) relationship between the communication beams. In this example, this QCL relationship can be utilized to identify the one or more communication beams. And the one or more universal TCI states can include applicability information to identify which control channels, such as the PDCCH and the PUCCH to provide some examples, data channels, such as the PDSCH and/or the PUSCH to provide some examples, and/or signals, such as the DMRS, the PTRS, the SRS, and/or the CSI-RS to provide some examples, are to utilize the communication beams identified by the one or more universal TCI states. Alternatively, or in addition to, the applicability information can further indicate applicable resources, and/or resource groups which are to utilize the communication beams identified by the one or more universal TCI states, such as, for example, PUCCH resource group index and/or Control Resource Set (CORESET) group index. Alternatively, or in addition to, the applicability information can further indicate the applicable serving cell index or serving cell group index which are to utilize the communication beams identified by the one or more universal TCI states.

Figure 3:
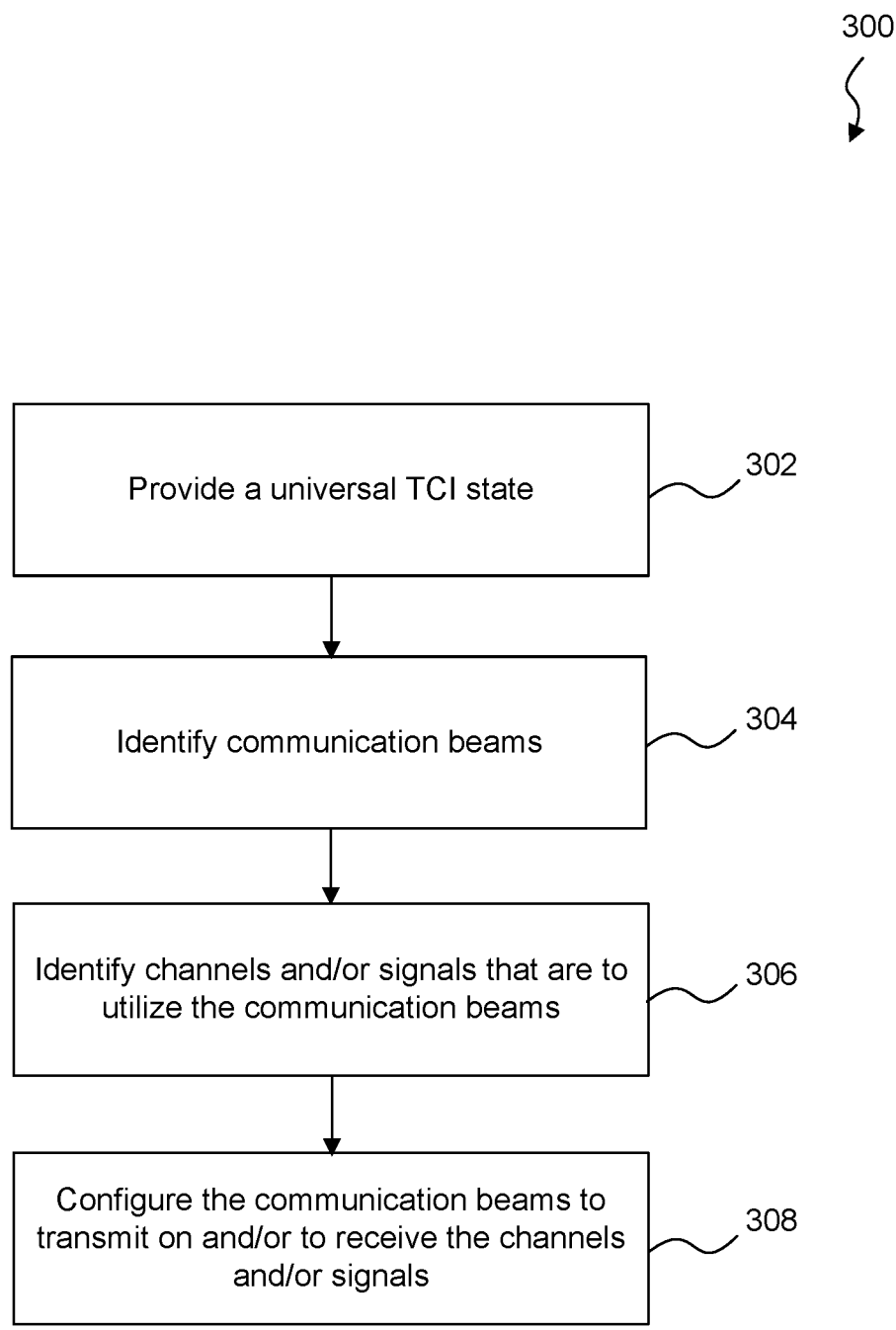
FIG. 3 illustrates a flowchart for implementing an exemplary unified framework for identifying which communication beams are to be uplink and/or downlink communication beams according to some embodiments of the disclosure.

FIG. 3 illustrates a flowchart for implementing an exemplary unified framework for identifying which communication beams are to be uplink and/or downlink communication beams according to some embodiments of the disclosure. The disclosure is not limited to this operational description. Rather, it will be apparent to ordinary persons skilled in the relevant art(s) that other operational control flows are within the scope and spirit of the disclosure. The following discussion describes an exemplary operational control flow 300 for implementing an exemplary unified framework for identifying which communication beams are to be uplink and/or downlink communication beams as described above. The operational control flow 300 can be performed by the AN 102, the UE 104, and/or the wireless system 200.

At operation 302, the operational control flow 300 provides a universal TCI state which can be used to identify communication beams, for example, one or more communication beams from among the communication beams 106.1 through 106.m, which are to be uplink and/or downlink communication beams. The universal TCI state includes applicability information which identifies the control channels, the data channels, and/or the signals that are to utilize the communication beams identified by the one or more universal TCI states. For example, the universal TCI state can identify that the communication beam 106.1 is to be a downlink communication beams and the applicability information can identify that the PDCCH, the PDSCH, or the PDCCH and the PDSCH are to utilize the communication beam 106.1. In some embodiments, operation 302 can be performed by the AN 102 as described above in FIG. 1 and/or the wireless system 200 as described above in FIG. 2. In these embodiments, the applicability information can be pre-defined and/or can be dynamically configured, for example, through a higher layer signaling, such as Radio Resource Control layer (RRC) signaling by the RRC layer as described above in FIG. 2 to configure the universal TCI state and/or a Media Access Control (MAC) Control Element (CE) of the MAC layer as described above in FIG. 2 to activate the TCI state. In some embodiments, the operational control flow 300 can dynamically send the universal TCI state in one or more in Downlink Control Information (DCI) messages on downlink control channels, for example, the PDCCH.

At operation 304, the operational control flow 300 identifies which communication beams, for example, one or more communication beams from among the communication beams 106.1 through 106.m, are identified in the universal TCI state that are to be uplink and/or downlink communication beams. In some embodiments, operation 302 can be performed by the UE 104 as described above in FIG. 1 and/or the wireless system 200 as described above in FIG. 1. For example, the universal TCI state states can include configuration parameters for configuring a quasi co-location (QCL) relationship between the communication beams. In this example, the operational control flow 300 can utilizes this QCL relationship can be utilized to identify the communication beams.

At operation 306, the operational control flow 300 identifies the control channels, such as the PDCCH and the PUCCH to provide some examples, the data channels, such as the PDSCH and/or the PUSCH to provide some examples, and/or the signals, such as the DMRS, the PTRS, the SRS, and/or the CSI-RS to provide some examples, that are to utilize the communication beams identified by the universal TCI state in operation 304. In some embodiments, operation 302 can be performed by the UE 104 as described above in FIG. 1 and/or the wireless system 200 as described above in FIG. 1.

At operation 308, the operational control flow 300 configures the communication beams identified by the universal TCI state in operation 304 to transmit on and/or to receive from the control channels, the data channels, and/or the signals identified in operation 306 using beam configuration information included within the universal TCI state.

As described above, the exemplary unified framework can utilize the one or more universal TCI states to identify the one or more communication beams that are to be utilized for uplink and/or downlink communication. Alternatively, or in addition to, the exemplary unified framework can re-purpose various Downlink Control Information (DCI) messaging fields specified in Rel-15 and Rel-16 and/or introduce new DCI formats to identify which communication beams are to be applied to the control channels, the data channels, and/or the signals to supplement the DCI messaging specified in Rel-15 and Rel-16. In these embodiments, the re-purposed DCI messaging fields and/or the new DCI formats can be pre-defined and/or can be dynamically configured, for example, through a higher layer signaling, such as Radio Resource Control layer (RRC) signaling by the RRC layer as described above in FIG. 2 to configure the re-purposed DCI messaging fields and/or the new DCI formats and/or a Media Access Control (MAC) Control Element (CE) of the MAC layer as described above in FIG. 2 to activate the re-purposed DCI messaging fields and/or the new DCI formats. Alternatively, or in addition to, the re-purposed DCI messaging fields and/or the new DCI formats can further indicate the applicable serving cell index or serving cell group index which are to utilize the communication beams identified by the one or more universal TCI states.

For example, DCI Format 1_0 and DCI Format 1_1 for DCI messaging as defined in Rel-15 and Rel-16 specify a one bit "Identifier for DCI formats" which is utilized for scheduling of the PDSCH. In this example, this "Identifier for DCI formats" field can be re-purposed to convey the applicability information as described above. In this example, the one bit "Identifier for DCI formats" can be extended to include any suitable number of bits to identify which communication beams, for example, one or more communication beams from among the communication beams 106.1 through 106.$m$, are to be uplink and/or downlink communication beams and which control channels, such as the PDCCH and the PUCCH to provide some examples, data channels, such as the PDSCH and/or the PUSCH to provide some examples, and/or signals, such as the DMRS, the PTRS, the SRS, and/or the CSI-RS to provide some examples, are to utilize the communication beams identified by the re-purposed "Identifier for DCI formats" field. Moreover, instead of using this "Identifier for DCI formats" field for only scheduling of the PDSCH as specified in Rel-15 and Rel-16, the exemplary unified framework can utilize this re-purposed "Identifier for DCI formats" field for all of the control channels and even the data channels and/or the signals.

Alternatively, or in addition to, the exemplary unified framework can introduce one or more new DCI formats to identify which communication beams are to be applied to the control channels, the data channels, and/or the signals. For example, the exemplary unified framework can introduce new DCI formats, for example, Format 3_0 and Format 3_1, that can be used to identify the one or more communication beams that are to be utilized for uplink and/or downlink communication. In this example, one or more of these new DCI formats can include a new field, such as, a new Radio Network Temporary ID (RNTI), to identify communication beams, for example, one or more communication beams from among the communication beams 106.1 through 106.$m$, and/or to identify which control channels, such as the PDCCH and the PUCCH to provide some examples, data channels, such as the PDSCH and/or the PUSCH to provide some examples, and/or signals, such as the DMRS, the PTRS, the SRS, and/or the CSI-RS to provide some examples, are to utilize the communication beams.

In some embodiments, the exemplary unified framework can implement a beam switching procedure to switch from the communication beams that are being utilized for uplink and/or downlink communication to the best communication beams from among the communication beams that can be utilized for uplink and/or downlink communication. The exemplary unified framework can monitor the best communication beams from among the communication beams that are to be utilized for uplink and/or downlink communication. For example, the exemplary unified framework can perform various measurements, for example, reference signal received power (RSRP) measurements, Received Signal Strength Indicator (RSSI) measurements, Reference Signal Received Quality (RSRQ) measurements, and/or signal-to-noise and interference ratio (SINR) measurements, on the communication beams. In this example, the exemplary unified framework can determine the best communication beams from among the communication beams that are to be utilized for uplink and/or downlink communication. The exemplary unified framework can switch to the best communication beams using the one or more universal TCI states, the re-purposed DCI messaging fields, and/or the new DCI formats as described above. In some embodiments, the exemplary unified framework can optimize the timing and/or the frequency of this beam switching. Moreover, the exemplary unified framework can implement a beam failure recovery procedure to indicate a failure of one or more of the communication beams that are utilized for uplink and/or downlink communication. As part of this beam failure recovery procedure, the exemplary unified framework can utilize one or more reserved resources of the control channels to identify one or more reserved communication beams that are to be utilized for uplink and/or downlink communication. The exemplary unified framework can reserve the one or more resources of the control channels, for example, one or more Control Resource Sets (CORESETs) and/or one or more PUCCH resources, whose location in the control channels can be indicated in the one or more universal TCI states, the re-purposed DCI messaging fields, and/or the new DCI formats. Once the one or more reserved communication beams have been recovered, the exemplary unified framework can implement the beam switching procedure to switch from the one or more reserved communication beams that are being utilized for uplink and/or downlink communication to the best communication beams from among the communication beams that can be utilized for uplink and/or downlink communication.

Different Number of Uplink and Downlink Communication Beams

The following detailed description is to describe various exemplary beam determination procedures that can support a different number of uplink communication beams compared to downlink communication beams. For example, the antenna array 206, as described above in FIG. 2, can include multiple antenna elements, each of which is capable of supporting one or more downlink communication beams and/or uplink communication beams. In some embodiments, a first group of one or more antenna elements from among the multiple antenna elements can support downlink communication beams and a second group of one or more antenna elements from among the multiple antenna elements can support uplink communication beams. In some embodiments, the first group of one or more antenna elements and/or the second group of one or more antenna elements can be derived from the one or more universal TCI states as described above. In these embodiments, the one or more universal TCI states can include a new TCI state field, for example, a srs-ResourceIndictor field, which can be utilized to derive the second group of one or more antenna elements to be used for, as an example, uplink codebook and/or non-codebook communication. Moreover, some of the exemplary beam determination procedures can indicate M-TCI states for downlink communication beams and N-TCI states for uplink communication beams. In these embodiments, M can be greater than or equal to N. For example, the exemplary beam determination procedures can indicate the M-TCI states for downlink communication beams, whereby the N-TCI states for uplink communication beams can be selected from among the M-TCI states for downlink communication beams. As another example, the exemplary beam determination procedures can only indicate the N-TCI states for uplink communication beams which are to be applied for both the uplink communication beams and the downlink communication beams.

Figure 4:
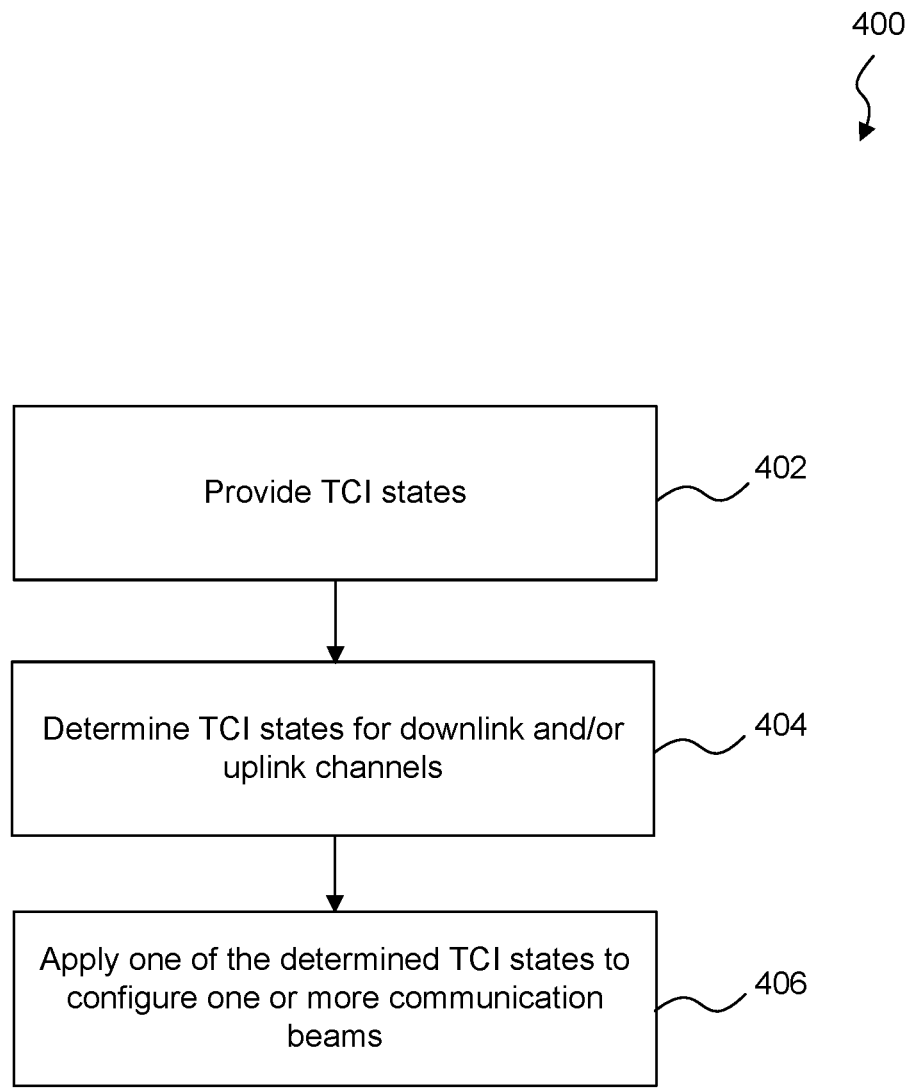
FIG. 4 illustrates a flowchart for exemplary beam determination procedures according to some embodiments of the disclosure.

FIG. 4 illustrates a flowchart for exemplary beam determination procedures according to some embodiments of the disclosure. The disclosure is not limited to this operational description. Rather, it will be apparent to ordinary persons skilled in the relevant art(s) that other operational control flows are within the scope and spirit of the disclosure. The following discussion describes an exemplary operational control flow 400 for implementing the exemplary beam determination procedures as described above. The operational control flow 400 can be performed by the AN 102, the UE 104, and/or the wireless system 200.

At operation 402, the operational control flow 400 provides multiple Transmission Configuration Indication (TCI) states, for example, multiple universal TCI states, as described above, to identify one or more communication beams that are to be utilized for uplink and/or downlink communication. In some embodiments, multiple antenna elements of an antenna array, such as the antenna array 206 to provide an example, of a User Equipment (UE), such as the UE 104 and/or the wireless system 200 to provide some examples, can include a first group of one or more antenna elements from among the multiple antenna elements can support downlink communication beams and a second group of one or more antenna elements from among the multiple antenna elements can support uplink communication beams. In these embodiments, the multiple Transmission Configuration Indication (TCI) states can include M-TCI states corresponding to the first group of the one or more antenna elements for downlink communication beams and/or N-TCI states corresponding to the second group of the one or more antenna elements for uplink communication beams. In some embodiments, operation 402 can be performed by the AN 102 as described above in FIG. 1 and/or the wireless system 200 as described above in FIG. 2.

At operation 404, the operational control flow 400 determines the TCI states for the downlink communication beams and/or the TCI states for the uplink communication beams from the multiple states of operation 402.

In some embodiments, the operational control flow 400 provides only the M-TCI states corresponding to the first group of the one or more antenna elements for downlink communication beams at operation 402. In these embodiments, the operational control flow 400 can select the N-TCI states corresponding to the second group of the one or more antenna elements for uplink communication beams from among the M-TCI states corresponding to the first group of the one or more antenna elements for downlink communication beams at operation 404. For example, the operational control flow 400 can select the first and/or the last TCI states from among the M-TCI states to be the N-TCI states. As another example, the operational control flow 400 can utilize a TCI state selection bit map to determine which TCI states from among the M-TCI states are to be the N-TCI states. In this other example, the TCI state selection bit map includes a sequence of logical values of logical ones and logical zeros, whereby the logical ones indicate that their associated TCI states from among the M-TCI states are applicable to be the N-TCI states and the logical zeros indicate that their associated TCI states from among the M-TCI states are not applicable to be the N-TCI states. In a further example, the operational control flow 400 can further indicate panel and/or group indexes for the multiple TCI states from operation 402. Each of these examples are to be further described in FIG. 5A through FIG. 5D below. Alternatively, or in addition to, in some embodiments, the operational control flow 400 provides only the N-TCI states corresponding to the second group of the one or more antenna elements for uplink communication beams. In these embodiments, the operational control flow 400 can select the M-TCI states corresponding to the first group of the one or more antenna elements for downlink communication beams to be the N-TCI states corresponding to the second group of the one or more antenna elements for uplink communication beams. In some embodiments, the operation 404 can be performed by the UE 104 as described above in FIG. 1 and/or the wireless system 200 as described above in FIG. 2.

At operation 406, the operational control flow 400 applies one of the determined TCI states from operation 404 to configure one or more of the one or more communication beams for downlink communication and/or for the uplink communication beams to configure one or more of the one or more communication beams for uplink and/or downlink communication. In some embodiments, operation 406 can be performed by the UE 104 as described above in FIG. 1 and/or the wireless system 200 as described above in FIG. 2.

FIG. 5A through FIG. 5D graphically illustrate exemplary selecting and applying operations for the exemplary beam determination procedures according to some embodiments of the disclosure. In some embodiments, FIG. 5A through FIG. 5D graphically illustrate various embodiments for the operation 404 and/or the operation 406 of the operational control flow 400 as described above in FIG. 4.

In the exemplary embodiment illustrated in FIG. 5A through FIG. 5C, the exemplary beam determination procedures selects the N-TCI states corresponding to the second group of the one or more antenna elements for uplink communication beams from among the M-TCI states corresponding to the first group of the one or more antenna elements for downlink communication beams. For example, as illustrated in FIG. 5A, the exemplary beam determination procedures, as described above, provides the TCI states 1 through 4. In this example, the exemplary beam determination procedures selects the TCI states 1 through 4 for the downlink communication beams and/or the TCI states 1 and 2 for the uplink communication beams and thereafter applies one or more of these TCI states to the downlink communication beams and/or the uplink communication beams after an applicable delay. As another example, as illustrated in FIG. 5B, the exemplary beam determination procedures, as described above, provides the TCI states 1 through 4 and a TCI state selection bit map indicating that the TCI states 1 and 4 are not applicable for the uplink communication beams and the TCI states 2 and 3 are applicable for the uplink communication beams. In this other example, the exemplary beam determination procedures selects the TCI states 1 through 4 for the downlink communication beams and/or the TCI states 2 and 3 for the uplink communication beams and thereafter applies one or more of these TCI states to the downlink communication beams and/or the uplink communication beams after the applicable delay. As a further example, as illustrated in FIG. 5C, the exemplary beam determination procedures, as described above, provides the TCI states 1 through 4 and a panel and/or group index for the TCI states 1 through 4. In this further example, the exemplary beam determination procedures selects the TCI states 1 through 4 for the downlink communication beams and/or the TCI states 1 and 3 for the uplink communication beams and thereafter applies one or more of these TCI states to the downlink communication beams and/or the uplink communication beams after the applicable delay.

In the exemplary embodiment illustrated in FIG. 5D, the exemplary beam determination procedures selects the M-TCI states corresponding to the first group of the one or more antenna elements for downlink communication beams to be the N-TCI states corresponding to the second group of the one or more antenna elements for uplink communication beams. For example, as illustrated in FIG. 5D, the exemplary beam determination procedures, as described above, provides the TCI states 1 and 2. In this example, the exemplary beam determination procedures selects the TCI states 1 and 2 for the downlink communication beams and/or the TCI states 1 and 2 for the uplink communication beams and thereafter applies one or more of these TCI states to the downlink communication beams and/or the uplink communication beams after an applicable delay.

Uplink Power Control Parameters

The following detailed description is to describe various exemplary beam determination procedures to derive uplink power control parameters when the Transmission Configuration Indication (TCI) states, for example, the one more universal TCI states as described above, are indicated for the uplink communication beams. These uplink power control parameters are used to determine transmit power of the different uplink control channels, such as the PUCCH to provide an example, uplink data channels, such as the PUSCH to provide an example, (PUCCH, PUSCH), and/or signals, such as the SRS to provide an example.

In some embodiments, the one or more universal TCI states can indicate a reference signal, such as the DMRS, the PTRS, the SRS, and/or the CSI-RS to provide some examples, which can be utilized to determine a path loss for the downlink to derive a path loss for the uplink. In some embodiments, the one or more universal TCI states can alternatively, or additionally, indicate one or more quasi co-location (QCL) relationships, for example, QCL-TypeD relationships, between two or more downlink reference signals. In these embodiments, the path loss for the uplink can be derived using one or more of these downlink reference signals indicated in the QCL-TypeD relationships. In some embodiments, the uplink power control parameters can include other uplink power control parameters in addition to the path loss, such as P0 or alpha to provide some examples, which can be configured through a higher layer signaling, such as Radio Resource Control layer (RRC) signaling by the RRC layer as described above in FIG. 2.

In some embodiments, one or more of the uplink power control parameters, for example, pathloss, P0, and or alpha to provide some examples, can be configured in the one or more universal TCI states. In these embodiments, these uplink power control parameters can be pre-defined and/or can be dynamically configured, for example, through a higher layer signaling, such as Radio Resource Control layer (RRC) signaling by the RRC layer as described above in FIG. 2 to configure the one or more universal TCI states and/or a Media Access Control (MAC) Control Element (CE) of the MAC layer as described above in FIG. 2 to activate the one or more universal TCI states. In these embodiments, these uplink power control parameters can be configured separately for different uplink channels, for example, the Physical Uplink Control Channel (PUCCH) and/or the Physical Uplink Shared Channel (PUSCH), and/or can be based on a unified signaling for corresponding uplink channels for different bandwidth parts (BWP) or different serving cells. For example, a common parameter pool, for example, a P0 list and a pathloss reference signal list, can be configured per bandwidth part (BWP) or per serving cell. Alternatively, or in addition to, the one or more of the uplink power control parameters can be derived based on predefined values for these uplink power control parameters.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

As described above, aspects of the disclosure may include the gathering and use of data available from various sources, for example, to improve or enhance functionality.

The disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (for example, vital signs measurements, medication information, exercise information), date of birth, or any other identifying or personal information. The disclosure recognizes that the personal information data may be used to the benefit of users.

The disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the disclosure also contemplates embodiments in which users selectively block the use of, or access to, personal information data. That is, the disclosure contemplates that hardware and/or software elements can be provided to prevent or block access to such personal information data. For example, the present technology may be configurable to allow users to selectively "opt in" or "opt out" of participation in the collection of personal information data, for example, during registration for services or anytime thereafter. In addition to providing "opt in" and "opt out" options, the disclosure contemplates providing notifications relating to the access or use of personal information. For instance, a user may be notified upon downloading an application that their personal information data will be accessed and then reminded again just before personal information data is accessed by the application.

Moreover, it is the intent of the disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (for example, date of birth, etc.), controlling the amount or specificity of data stored (for example, collecting location data a city level rather than at an address level), controlling how data is stored (for example, aggregating data across users), and/or other methods.

Therefore, although the disclosure may broadly cover use of personal information data to implement one or more various disclosed embodiments, the disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for implementing a beam determination procedure, the method comprising:
   receiving, by a User Equipment (UE) from an Access Node (AN), a universal Transmission Configuration Indication (TCI) state that identifies a plurality of communication beams to be used for downlink communications and uplink communications, the universal TCI state including applicability information;
   identifying, by the UE, a first communication beam from among the plurality of communication beams from the universal TCI state that is to be an uplink communication beam and a second communication beam from among the plurality of communication beams from the universal TCI state that is be a downlink communication beam;
   identifying, by the UE, one or more control channels, one or more data channels, or one or more signals from the applicability information that are to utilize the first communication beam or the second communication beam; and
   configuring, by the UE, the first communication beam or the second communication beam to utilize the one or more control channels, the one or more data channels, or the one or more signals.

2. The method of claim 1, wherein the one or more control channels comprise:
   a Physical Downlink Control Channel (PDCCH); or
   a Physical Uplink Control Channel (PUCCH),
   wherein the one or more data channels comprise:
      a Physical Downlink Shared Channel (PDSCH); or
      a Physical Uplink Shared Channel (PUSCH), and
   wherein the one or more signals comprise:
      a demodulation reference signal (DMRS);
      a phase-tracking reference signal (PTRS);
      a sounding reference signal (SRS); or
      a channel-state information reference signal (CSI-RS).

3. The method of claim 1, wherein the receiving comprises:
   receiving, by the UE, one or more Downlink Control Information (DCI) messages, one or more Medium Access Channel (MAC) Control Elements (CEs), or one or more Radio Resource Control (RRC) messages having the universal TCI state.

4. The method of claim 3, wherein the one or more DCI messages, the MAC CEs, or the RRC messages include one or more fields to identify the plurality of communication beams or the one or more control channels, the one or more data channels, or the one or more signals.

5. The method of claim 1, wherein the universal TCI state comprises one or more configuration parameters for configuring one or more quasi co-location (QCL) relationships between the first communication beam and the second communication beam,
   wherein the identifying the first communication beam comprises identifying the first communication beam from the second communication beam based upon the one or more QCL relationships.

6. The method of claim 1, wherein the receiving comprises:
   receiving, by the UE from the AN, a plurality of universal TCI states having a first group of universal TCI states corresponding to a first group of one or more antenna elements of the UE for downlink communication beams, and
   further comprising:

selecting, by the UE, a second group of universal TCI states corresponding to a second group of one or more antenna elements of the UE from among the first group of universal TCI states for uplink communication beams, and wherein the identifying comprises identifying the first communication beam from among the second group of universal TCI states and the second communication beam from among the first group of universal TCI states.

7. The method of claim 6, wherein the selecting comprises:

selecting, by the UE, the second group of universal TCI states in accordance with a TCI state selection bit map.

8. A User Equipment (UE) for implementing a beam determination procedure, the UE comprising:

physical layer (PHY) circuitry configured to receive a universal Transmission Configuration Indication (TCI) state from an Access Node (AN) that identifies a plurality of communication beams to be used for downlink communications and uplink communications, the universal TCI state including applicability information; and processor circuitry configured to:
identify a first communication beam from among the plurality of communication beams from the universal TCI state that is to be an uplink communication beam and a second communication beam from among the plurality of communication beams from the universal TCI state that is be a downlink communication beam;

identify one or more control channels, one or more data channels, or one or more signals from the applicability information that are to utilize the first communication beam or the second communication beam; and configure the first communication beam or the second communication beam to utilize the one or more control channels, the one or more data channels, or the one or more signals.

9. The UE of claim 8, wherein the one or more control channels comprise:
a Physical Downlink Control Channel (PDCCH); or
a Physical Uplink Control Channel (PUCCH),
wherein the one or more data channels comprise:
a Physical Downlink Shared Channel (PDSCH); or
a Physical Uplink Shared Channel (PUSCH), and
wherein the one or more signals comprise:
a demodulation reference signal (DMRS);
a phase-tracking reference signal (PTRS);
a sounding reference signal (SRS); or
a channel-state information reference signal (CSI-RS).

10. The UE of claim 8, wherein the PHY circuitry is configured to receive one or more Downlink Control Information (DCI) messages, one or more Medium Access Channel (MAC) Control Elements (CEs), or one or more Radio Resource Control (RRC) messages having the universal TCI state.

11. The UE of claim 10, wherein the one or more DCI messages, the MAC CEs, or the RRC messages include one or more fields to identify the plurality of communication beams or the one or more control channels, the one or more data channels, or the one or more signals.

12. The UE of claim 8, wherein the universal TCI state comprises one or more configuration parameters for configuring one or more quasi co-location (QCL) relationships between the first communication beam and the second communication beam, and wherein the processor circuitry is configured to identify the first communication beam from the second communication beam based upon the one or more QCL relationships.

13. The UE of claim 8, wherein the PHY circuitry is configured to:

receive a plurality of universal TCI states having a first group of universal TCI states corresponding to a first group of one or more antenna elements of the UE for downlink communication beams, select a second group of universal TCI states corresponding to a second group of one or more antenna elements of the UE from among the first group of universal TCI states for uplink communication beams, and identify the first communication beam from among the second group of universal TCI states and the second communication beam from among the first group of universal TCI states.

14. The UE of claim 13, wherein the processor circuitry is configured to select the second group of universal TCI states in accordance with a TCI state selection bit map.

15. A wireless network for implementing a beam determination procedure, the wireless network comprising:

an Access Node (AN) configured to provide a universal Transmission Configuration Indication (TCI) state that identifies a plurality of communication beams to be used for downlink communications and uplink communications, the universal TCI state including applicability information; and a User Equipment (UE) configured to:
identify a first communication beam from among the plurality of communication beams from the universal TCI state that is to be an uplink communication beam and a second communication beam from among the plurality of communication beams from the universal TCI state that is to be a downlink communication beam;

identify one or more control channels, one or more data channels, or one or more signals from the applicability information that are to utilize the first communication beam or the second communication beam; and configure the first communication beam or the second communication beam to utilize the one or more control channels, the one or more data channels, or the one or more signals.

16. The wireless network of claim 15, wherein the one or more control channels comprise:
a Physical Downlink Control Channel (PDCCH); or
a Physical Uplink Control Channel (PUCCH),
wherein the one or more data channels comprise:
a Physical Downlink Shared Channel (PDSCH); or
a Physical Uplink Shared Channel (PUSCH), and
wherein the one or more signals comprise:
a demodulation reference signal (DMRS);
a phase-tracking reference signal (PTRS);
a sounding reference signal (SRS); or
a channel-state information reference signal (CSI-RS).

17. The wireless network of claim 15, wherein the UE is configured to receive one or more Downlink Control Information (DCI) messages, one or more Medium Access Channel (MAC) Control Elements (CEs), or one or more Radio Resource Control (RRC) messages having the universal TCI state.

18. The wireless network of claim 10, wherein the one or more DCI messages, the MAC CEs, or the RRC messages include one or more fields to identify the plurality of communication beams or the one or more control channels, the one or more data channels, or the one or more signals.

19. The wireless network of claim 15, wherein the universal TCI state comprises one or more configuration parameters for configuring one or more quasi co-location (QCL) relationships between the first communication beam and the second communication beam, and wherein the UE is configured to identify the first communication beam from the second communication beam based upon the one or more QCL relationships.

20. The wireless network of claim 15, wherein the UE is further configured to:

receive a plurality of universal TCI states having a first group of universal TCI states corresponding to a first group of one or more antenna elements of the UE for downlink communication beams, select a second group of universal TCI states corresponding to a second group of one or more antenna elements of the UE from among the first group of universal TCI states for uplink communication beams, and identify the first communication beam from among the second group of universal TCI states and the second communication beam from among the first group of universal TCI states.

\* \* \* \* \*

Disclaimer

12,107,797 B2 - Yushu Zhang, Beijing (CN); Dawei Zhang, Saratoga, CA (US); Haitong Sun, Cupertino, CA (US); Wei Zeng, Saratoga, CA (US). ROBUST UPLINK AND DOWNLINK BEAM INDICATION. Patent dated October 1, 2024. Disclaimer filed February 3, 2024, by the assignee, DUALL ESPRESSO IP ENFORCEMENT, LLC.

I hereby disclaim the following complete Claims 11-16 of said patent.

*(Official Gazette, April 8, 2025)*